F. R. WARREN.
STEERING WHEEL LOCK.
APPLICATION FILED DEC. 5, 1919.
1,349,027.
Patented Aug. 10, 1920.
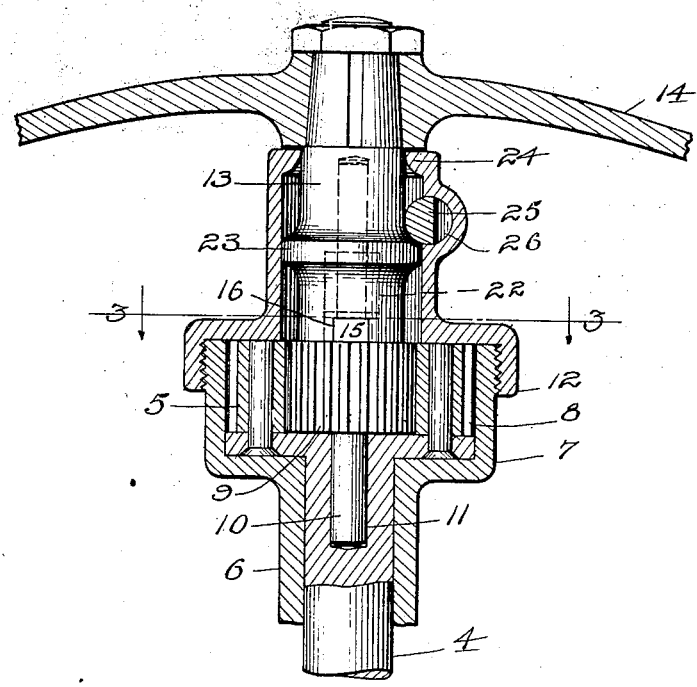
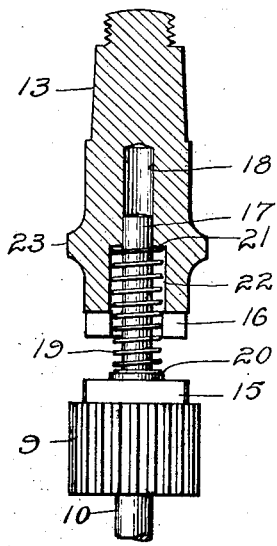
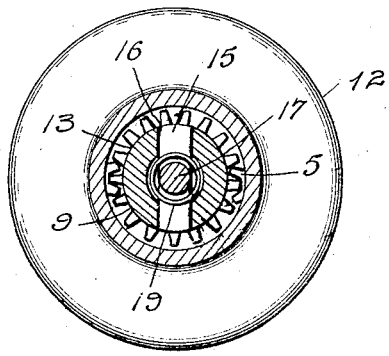
Inventor,
Frank R. Warren
By Glenn S. Noble
Atty.
Witness:

UNITED STATES PATENT OFFICE.

FRANK R. WARREN, OF CHICAGO, ILLINOIS.

STEERING-WHEEL LOCK.

1,349,027. Specification of Letters Patent. Patented Aug. 10, 1920.

Application filed December 5, 1919. Serial No. 342,657.

*To all whom it may concern:*

Be it known that I, FRANK R. WARREN, a citizen of the United States, residing at Chicago, in the county of Cook and State of Illinois, have invented certain new and useful Improvements in Steering-Wheel Locks, of which the following is a specification.

This invention relates to means for locking vehicles and is particularly applicable to the steering wheels of motor vehicles, providing means for locking the wheels in operative and also in inoperative positions.

The objects of this invention are to provide simple and efficient means for locking a vehicle; to provide means for locking the steering wheel in one or more positions; to provide resilient means for moving, and tending to hold, a vehicle steering wheel in a predetermined position; to provide a spring which coöperates with a vehicle steering mechanism and tends to move the same into inoperative position; and in general to provide such an improved device as will appear more fully from the following description.

In the accompanying drawings illustrating this invention:

Figure 1 is a longitudinal view, partly in section, showing the lock as applied to a common type of steering mechanism having planetary gears.

Fig. 2 is a sectional detail showing the wheel stub shaft in raised position: and Fig. 3 is a cross-section taken on line 3—3 of Fig. 1.

In the particular form of my invention, as shown in these drawings, 4 represents the usual steering post which carries the small pinions 5 at its upper end. The tube or column 6 carries the casing 7 having the internal gear 8 therein. The usual stub shaft which carries the steering wheel is removed or omitted and I provide a central gear or pinion 9 which preferably has a stem 10 projecting into a hole 11 in the steering post 4. A cap 12 engages with the casing 7 and provides a main support or bearing for a stub shaft 13 which carries the steering wheel 14. The stub shaft 13 is not fixed to the pinion or gear 9 but is brought into operative relation thereto by means of any suitable clutching or engaging devices. In the present instance the gear 9 has a lug or jaw 15 which engages with a slot 16 in the lower end of the stub shaft 13, but any suitable co-acting lugs may be provided for these parts. The gear 9 and stub shaft 13 are preferably further held in alinement by a pin on one of these parts which engages with a hole in the other part. As shown, the gear 9 has a pin 17 which has a sliding fit in the hole 18 in the stub shaft.

One of the principal novel features of this invention is the provision of means for holding or urging the steering wheel in a predetermined position with respect to the clutching device. In order to do this, I have shown a spring 19, one end of which abuts against a shoulder 20 on the gear 9 and the other end against a shoulder 21 at the bottom of a hole or recess 22 in the end of the stub shaft 13. It will be seen that this spring tends to raise the stub shaft so as to raise the steering wheel and to hold the clutching device out of operative relation, in which case the wheel is free to spin without actuating the steering post.

Any suitable means may be provided for locking the device in this position and also for locking it in engaging position. As illustrating such means I prefer to have the stub shaft 13 provided with an annular projection 23 which fits within the bore of the upper part of the cap 12, the extreme end of the cap having an inwardly projecting flange 24 for engagement with the projection 23 to stop the upward movement of the stub shaft. A bolt 25 is mounted in the cap and adapted to engage with the annular projection 23 in order to fasten the stub shaft in either raised or lowered position. This bolt may be actuated by any suitable form of lock (not shown).

When the parts are in the position shown in Fig. 1, the stub shaft is locked in driving engagement with the gear 9 so that the vehicle may be steered by the steering wheel. When the driver wishes to lock the vehicle, he turns the bolt 25 so that the recess 26 will register with the projection 23 and permits the spring 19 to raise the stub shaft and steering wheel so that the slot 16 will be disengaged from the jaw 15. The bolt 25 may be again turned to its initial position to lock the stub shaft in this raised position. It will be noted that the steering wheel is free to spin without turning the steering post and therefore the vehicle cannot be controlled. It will be noted that, when the operator desires to drive the vehicle, he must press down on the steering wheel and be sure to bring the clutching device into operative position, and lock the same in this position before he can steer the car. This will avoid the possibility of only partially engaging the steering mechanism which might otherwise occur if it were not for the spring. It will thus be seen that this arrangement provides an automatic safety signal which will notify the driver that the wheel is not locked, as the wheel must be positively locked in operative position before the car can be driven. In some instances, it may be desired to have the spring operate in the opposite direction so as to tend to draw the clutching device into engagement instead of forcing them apart, but in most cases I consider that the above described arrangement is preferable. It will also be noted that the device may be modified in construction to adapt it to different types of steering mechanism.

From the above description it will be seen that I provide a unique locking device which may be readily applied to Ford cars by changing a comparatively few parts and one which may be adapted for other cars by making the necessary modifications. Having thus described my invention which I do not wish to limit to the exact arrangement shown and described, except as specified in the following claims, what I claim and desire to secure by Letters Patent is:

1. In a steering wheel lock and indicating device; the combination of a steering post, a stub shaft in alinement with the steering post, a steering wheel on said stub shaft, means for supporting said post and shaft whereby the stub shaft may be moved longitudinally, means whereby when the stub shaft is in depressed position, it will be operatively connected with the steering post, and when the stub shaft is in raised position it will be disconnected from the steering post, resilient means tending to urge the stub shaft to raised position and locking means for holding the wheel in depressed and raised positions.

2. In a vehicle steering mechanism, the combination of a steering post, a steering wheel mounted so that it may be moved vertically with respect to the post, means whereby the post may be rotated by the wheel when the wheel is in lowered position and will not be rotated by the wheel when the wheel is in raised position, a spring for moving the wheel into raised position and means for locking the wheel in lowered and raised positions.

3. In a steering mechanism, the combination of a steering post, a wheel adapted to move up and down with respect to the post, clutch mechanism for turning the post when the wheel is in down or depressed position, and disconnecting the wheel from the post when the wheel is in up or elevated position, a spring tending to move the wheel to disconnected position, and means for fastening the wheel in either of said positions.

4. In a device of the character set forth, a steering post, a steering wheel mounted to move from a lower position to a higher position with respect to the post, means whereby the rotation of the wheel when it is in its first position will cause rotation of the post and whereby the rotation of the wheel in its second position will not cause rotation of the post, a spring for holding the wheel normally in the second position, and means for fastening the wheel in either of said positions.

5. The combination with a steering wheel, of clutching mechanism for bringing it into operative relation with the steering post, and resilient means for holding the wheel with the clutching mechanism in inoperative position.

6. The combination with a planetary gear steering mechanism having a center gear, of a jaw on the center gear, a stub shaft having a slot for engagement with the jaw, a steering wheel secured to the stub shaft, a spring interposed between the gear and stub shaft tending to separate the same, and means for locking the shaft with the slot engaging said jaw and also with the slot disengaged from the jaw.

7. The combination with the center gear of a planetary gear steering device, of a steering wheel, interlocking means for connecting the wheel with the gear and disconnecting the same therefrom, a spring tending to hold said interlocking means in disengaging position, and means for fastening the interlocking means in either engaging or disengaging positions.

8. The combination with a steering post, of a stub shaft in alinement therewith, means for supporting the stub shaft to permit the same to have a limited longitudinal movement, a steering wheel on said stub shaft, means depending upon the longitudinal position of the stub shaft for operatively connecting the stub shaft with the steering post or disconnecting the same therefrom whereby these parts will be disconnected when the stub shaft is raised, a spring tending to hold said stub shaft and wheel in raised position, and locking means for holding the shaft in either engaged or disengaged position.

9. In an apparatus of the character set forth, the combination of a steering column having a casing at its upper end, a steering post in said column, planetary gearing mounted in said casing for turning said post, said gearing including a center driving gear, a cap for said casing, a stub shaft mounted in the cap above the center gear, a clutch between the stub shaft and center gear, a spring tending to hold said stub shaft in raised position, in which position it is unclutched from the center gear, locking means for locking the stub shaft in either clutchd or unclutched position, and a steering wheel on said shaft.

FRANK R. WARREN.